United States Patent
Asahi

(10) Patent No.: US 7,035,973 B2
(45) Date of Patent: Apr. 25, 2006

(54) STORAGE CONTROL APPARATUS AND METHOD FOR CONTROLLING LOGICAL VOLUMES BY REFERRING TO MOUNTING INFORMATION INDICATING MOUNTING STATES OF THE LOGICAL VOLUMES

(75) Inventor: Akitoshi Asahi, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 10/639,873

(22) Filed: Aug. 13, 2003

(65) Prior Publication Data

US 2004/0205293 A1 Oct. 14, 2004

(30) Foreign Application Priority Data

Apr. 8, 2003 (JP) .............................. 2003-103537

(51) Int. Cl.
*G06F 12/00* (2006.01)
(52) U.S. Cl. .................. 711/114; 711/162; 711/111; 711/112; 711/163; 707/9; 714/7
(58) Field of Classification Search ................ None
See application file for complete search history.

(56) References Cited

U.S. PATENT DOCUMENTS

| | | | |
|---|---|---|---|
| 5,546,557 A * | 8/1996 | Allen et al. ................. | 711/111 |
| 6,044,442 A | 3/2000 | Jesionowski | |
| 6,606,695 B1 | 8/2003 | Kamano et al. ............ | 711/163 |
| 6,684,209 B1 | 1/2004 | Ito et al. ........................ | 707/9 |
| 6,854,034 B1 | 2/2005 | Murakami et al. .......... | 711/112 |
| 6,961,811 B1 * | 11/2005 | Dawson et al. ............. | 711/112 |
| 2003/0191890 A1 | 10/2003 | Okamoto et al. ........... | 711/112 |
| 2004/0015668 A1 | 1/2004 | McBrearty et al. ......... | 711/163 |
| 2004/0083401 A1 | 4/2004 | Furukawa et al. ............ | 714/7 |

FOREIGN PATENT DOCUMENTS

| | | |
|---|---|---|
| JP | 05-028088 | 2/1993 |
| JP | 06-214766 | 8/1994 |
| JP | 06-3377661 | 12/1994 |
| JP | 08-212096 | 8/1996 |
| JP | 2001-265655 | 9/2001 |
| JP | 2001-337863 | 12/2001 |

\* cited by examiner

*Primary Examiner*—Gary Portka
*Assistant Examiner*—Mardochee Chery
(74) *Attorney, Agent, or Firm*—Mattingly, Stanger, Malur & Brundidge, P.C.

(57) ABSTRACT

A storage control apparatus has a plurality of logical volumes that store data received according to write requests from information processing apparatuses, a table that manages whether each logical volume is mounted by an information processing apparatus. Other information processing apparatuses refer to the table before beginning any mounting.

24 Claims, 5 Drawing Sheets

Diagram of Processing Order in Volume Copy

Processing Flow to Mount Volume

Processing Flow to Unmount Volume

Fig. 6

Mounting Management Table

| Logical Volume Number | State of Mounting Flag (ON/OFF)<br>ON: Mounted State<br>OFF: Not-mounted State |
|---|---|
| 151 | ON |
| 152 | OFF |

STORAGE CONTROL APPARATUS AND METHOD FOR CONTROLLING LOGICAL VOLUMES BY REFERRING TO MOUNTING INFORMATION INDICATING MOUNTING STATES OF THE LOGICAL VOLUMES

BACKGROUND OF THE INVENTION

1. Field of the Invention

The present invention relates to a storage control apparatus such as a disk array apparatus, as well as its control method, and more particularly to the management of logical volumes inside the storage control apparatus.

2. Related Background Art

One of the measures to improve the reliability of disk array apparatuses is a method to make a copy (a backup of data) of logical volumes. When data within a logical volume at a certain point in time is saved as a copy on another logical volume, the copy can be used to recover data in the event of a failure.

If a plurality of information processing apparatuses (hereinafter called "host apparatuses"), which issue copy instructions between logical volumes and access data, is connected to such a disk array apparatus, a plurality of host apparatuses may be allowed to simultaneously access one logical volume. An access is made when performing a copy operation of a volume, and referring to or writing data in storage media, and is hereinafter called simply an "access."

When accessing data in a disk array apparatus from a host apparatus, an operation called "mounting" needs to take place. A mounting refers to having peripheral equipment, such as a disk array apparatus, connected to a host apparatus be recognized by the host apparatus and enabling the disk array apparatus to be operated by the host apparatus. In storage control apparatuses, a mounting refers to making a certain logical volume accessible when the host apparatus attempts to access the logical volume.

When a mounting operation is performed on a disk array apparatus for a host apparatus, the host apparatus and the disk array apparatus exchange protocol information regarding mutual communications between their respective connection ports, thereby establishing a state in which communications can begin. Specifically, a host apparatus that attempts to access a certain logical volume sends to a storage system having the logical volume a frame containing an inquiry command. An inquiry command is a standard command for communications environment setting defined according to SCSI standards.

At least the source ID (S_ID) of the host apparatus and a logical unit number (LUN), which is an identifier of the logical unit being inquired, are included in the frame.

Upon receiving the inquiry command, the storage system analyzes the frame and checks whether the logical volume that is the subject of an access is mounted (i.e., whether it is accessible); if the logical volume is already mounted, the storage system establishes settings accordingly and sends back inquiry data. Upon receiving the inquiry data and confirming that the logical volume is accessible, the host apparatus can thereafter continuously issue I/O requests, such as read/write or copy instructions between logical volumes.

When a plurality of host apparatuses can access the same logical volume as in the situation described above, if an attempt is made to copy a logical volume a, which is mounted by a host apparatus A, to a logical volume β based on an instruction from a host apparatus B, there is a possibility that data in the logical volume a that is to be copied could be rewritten by the host apparatus A after the copy processing begins.

In other words, a data image of the logical volume a of a certain point in time that the host apparatus B is trying to copy could be rewritten by the host apparatus A after the copy processing begins, which could result in the host apparatus B's not being able to obtain a copy of data of the point in time intended (i.e., data corruption). In the present specification, data corruption includes situations in which data becomes data not intended by an operator due to an operation error by another operator.

On the other hand, when a logical volume β is designated as a copy destination target volume in making a copy of a logical volume α, which is under the control of a host apparatus A, if the target volume β is mounted by another host apparatus other than the host apparatus A, the target volume β can be rewritten by the host apparatus other than the host apparatus A during the copy processing, resulting in an unexpected data failure.

In order to prevent such situations, an operator of a volume copy operation must check if logical volumes that are either a copy source or a copy destination are not mounted by any other host apparatuses before copying the copy source logical volume. Manually performing the management check operation to prevent such data corruption is a major operational load for operators of volume copy operations.

The only apparatus that can recognize whether a logical volume is mounted by a host apparatus is the host apparatus that is actually mounting the logical volume; other host apparatuses cannot recognize whether the target logical volume is already mounted by any other host apparatus.

Consequently, ascertaining whether a logical volume that is the target of an operation is already mounted by another host apparatus requires checking through each and every host apparatus.

SUMMARY OF THE INVENTION

The present invention has been conceived in order to solve such a problem.

An embodiment of the present invention relates to a storage control apparatus including a plurality of logical volumes that store data resulting from write requests from information processing apparatuses. The storage control apparatus may include a plurality of ports that are to be connected to the information processing apparatuses, a microprocessor that controls writing and reading of data to and from the logical volumes, and a memory that the microprocessor refers to, wherein the memory stores information that indicates whether each of the plurality of logical volumes is mounted by any of the information processing apparatuses.

In accordance with an embodiment of the present invention, there is provided a control method for a storage control apparatus that is essentially formed from a first port connected to a first information processing apparatus, a second port connected to a second information processing apparatus, a plurality of logical volumes that store write data received from a plurality of information processing apparatuses via the ports, a microprocessor that controls writing and reading of data to and from the logical volumes, and a memory that stores information that is referred to by the microprocessor and that indicates the mounting status of each logical volume. The control method may include: a first step of updating the mounting status of each of the logical volumes inside the memory in response to a mounting/ unmounting request for the logical volumes from the first information processing apparatus or the second information processing apparatus; a second step of referring to mounting information inside the memory when the storage control apparatus copies a data image of one of the plurality of logical volumes to another logical volume; and a step of stopping the copy execution if in the second step the one of the logical volumes or the another logical volume is in a mounted state.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 6 shows a diagram of an example of a mounting management table in accordance with an embodiment of the present invention.

DESCRIPTION OF PREFERRED EMBODIMENT

Figure 1:
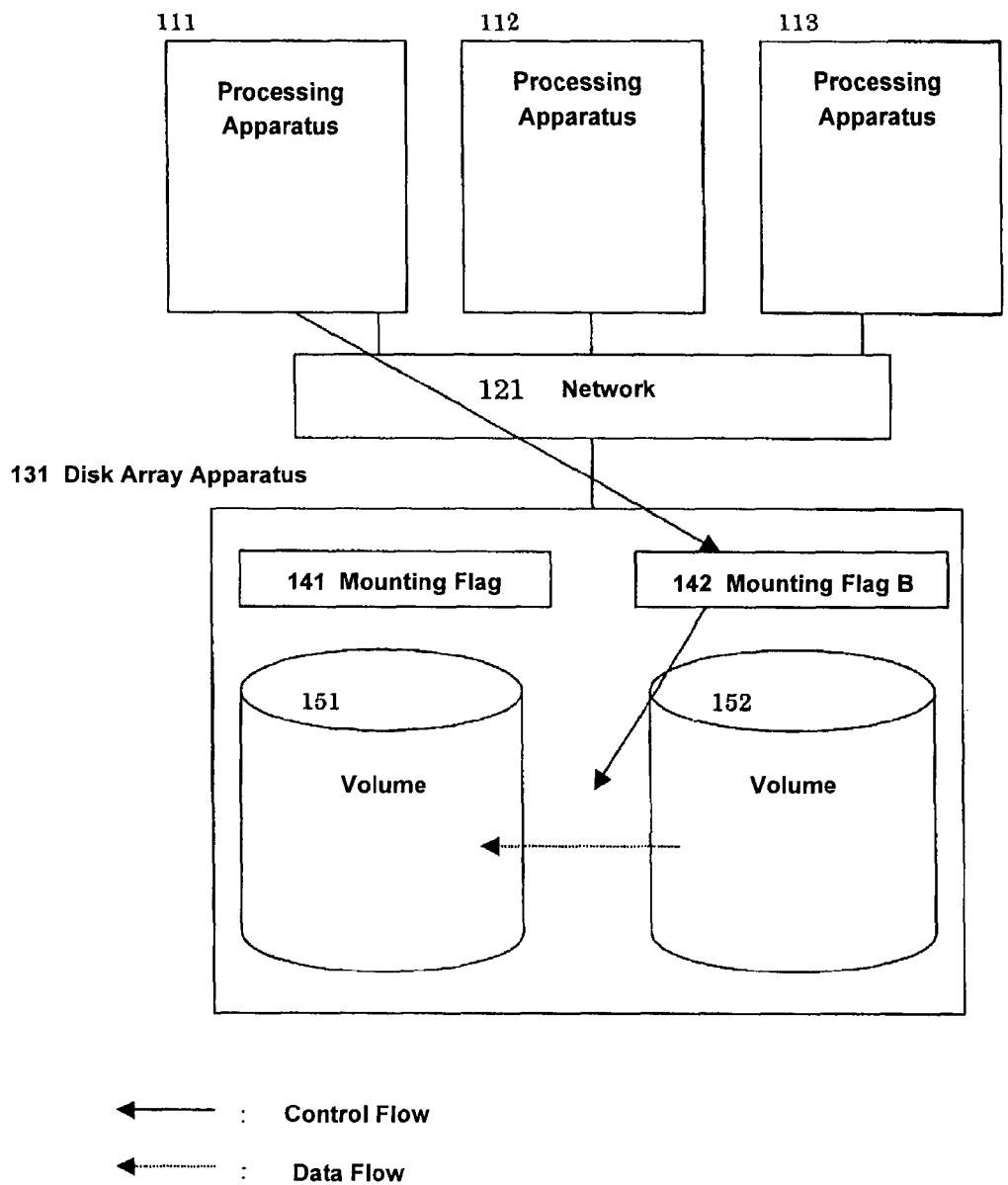
FIG. 1 shows a conceptual drawing illustrating the concept of the present invention.

FIG. 1 is a conceptual drawing of the present invention. Information processing apparatuses (hereinafter called "processing apparatuses"), such as computers 111,112 and 113 are connected to a disk array apparatus 131 via a network 121. Such information processing apparatuses are sometimes simply called "host apparatuses."

The disk array apparatus 131 has a plurality of volumes 151,152, which are storage regions for storing data. The disk array apparatus 131 has mounting flags 141,142, which are management tables of mounting status, inside a control memory of the disk array apparatus 131. In one embodiment of the present invention, when the processing apparatus 111 copies data inside the volume 152 to the volume 151, the processing apparatus 111 refers to the mounting flag 142 and determines whether the volume 152 is mounted by another processing apparatus, such as the processing apparatus 112 or 113 in FIG. 1. If as a result of the determination the volume 152 is found not to be mounted by any other processing apparatus, a copy processing is executed.

Figure 2:
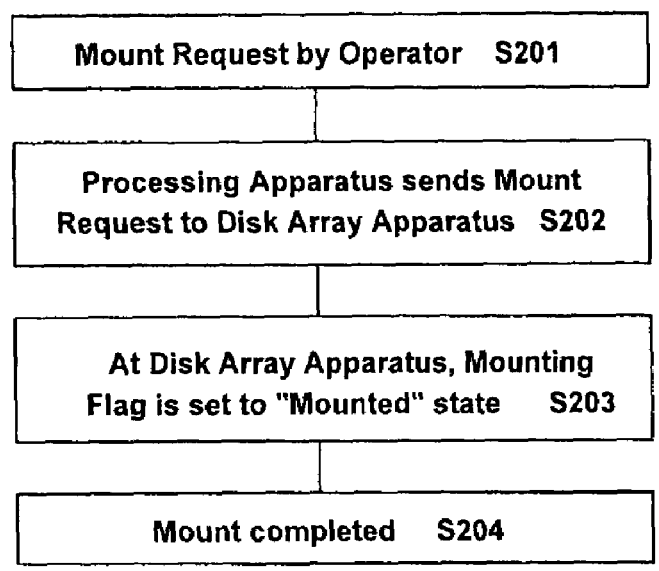
FIG. 2 shows a flowchart of a processing to mount a volume in accordance with an embodiment of the present invention.

FIG. 2 indicates a procedure that is applicable when one of the processing apparatuses 111,112 and 113 mounts one of the volumes 151 and 152, in accordance with an embodiment of the present invention. First, in step 201, the applicable processing apparatus receives a mounting request from an operator; in step 202, the processing apparatus issues the mounting request to the disk array 131. In step 203, the disk array apparatus 131 transfers the designated volume to a mounted state in response to the request and sets the corresponding mounting flag, described later, to a mounted state.

Figure 3:
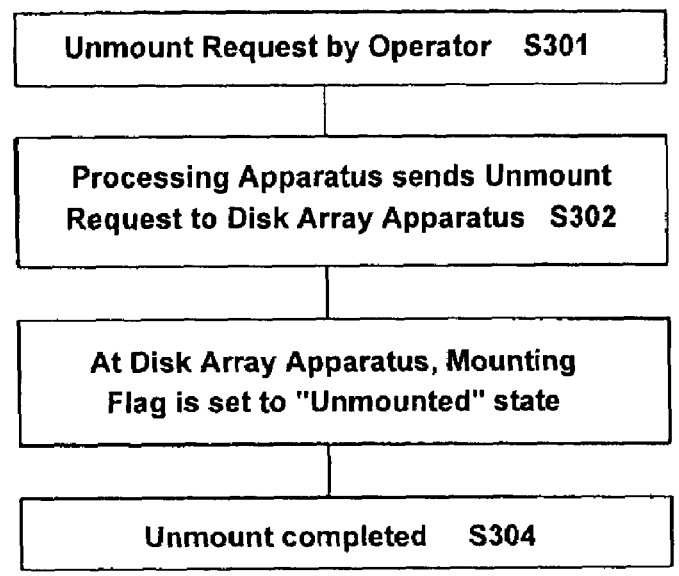
FIG. 3 shows a flowchart of a processing to unmount a volume in accordance with an embodiment of the present invention.

FIG. 3 indicates a procedure of a processing for releasing the mounted state set in FIG. 2.

In step 301, when the applicable processing apparatus receives an unmounting (i.e., a non-mounted state) processing from an operator, the processing apparatus in step 302 issues an unmounting request to the disk array apparatus 131. In step 303, the disk array apparatus 131 transfers the designated volume from the mounted state to an unmounted state, and at the same time changes the mounting status of the corresponding mounting flag to indicate the unmounted state.

Due to the fact that the disk array 131 executes the procedures indicated in step 203 in FIG. 2 and step 303 in FIG. 3, the disk array apparatus 131 becomes capable of managing the mounting status of the volumes 151 and 152.

Figure 4:
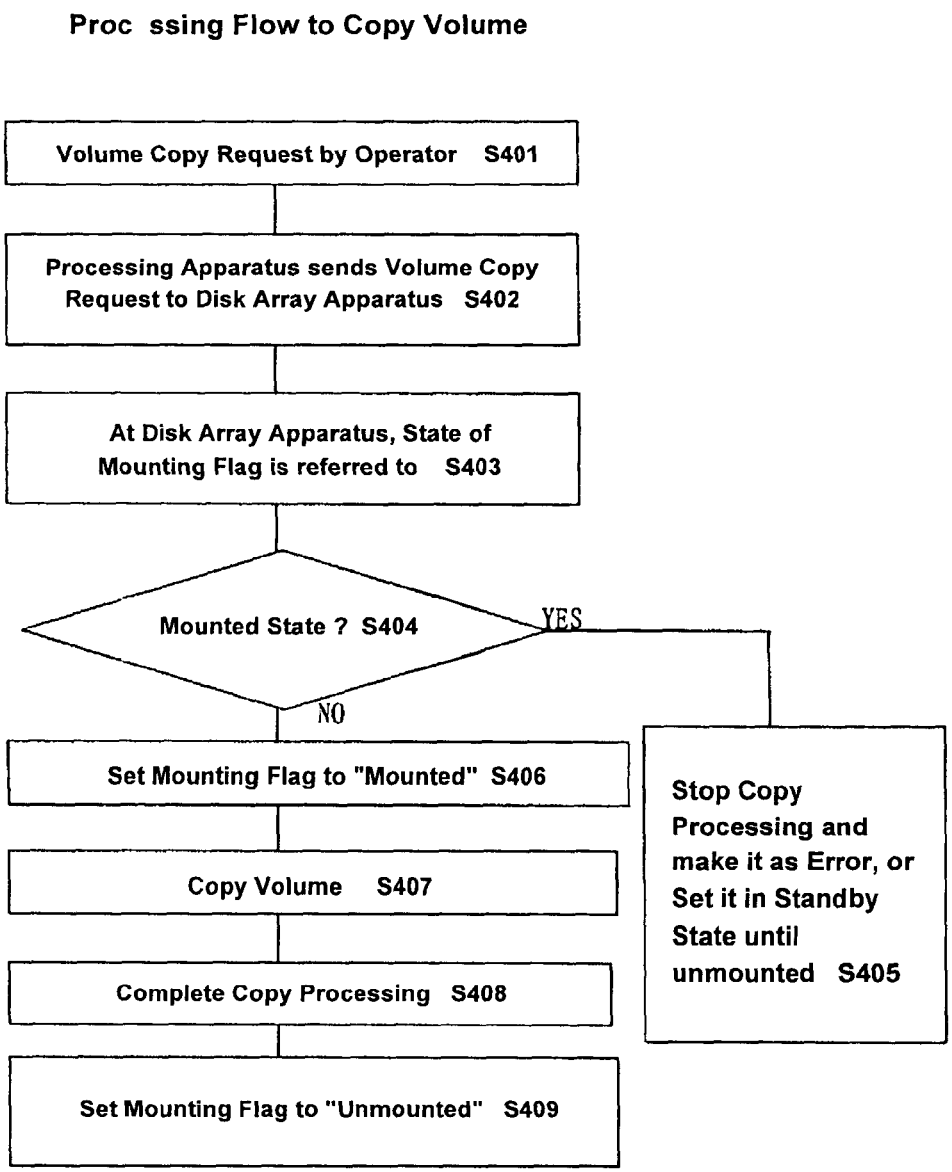
FIG. 4 shows a flowchart of a processing procedure for a request to copy a volume.

FIG. 4 is a flowchart of a procedure for referring to the mounting flags 141, 142 and determining whether a copy operation can be executed in accordance with an embodiment of the present invention when there is a copy request to copy data between volumes. The applicable processing apparatus that receives a volume copy request from an operator in step 401 issues a volume copy request to the disk array apparatus 131 (step 402).

In step 403, the disk array apparatus 131 refers to the mounting flags 141 and 142 in FIG. 1, and determines if either a copy source logical volume or a copy destination logical volume is in a mounted state with another host apparatus (step 404).

If as a result of the determination in step 404 neither the copy source nor the copy destination logical volume is found to be in a mounted state, the corresponding mounting flags are transferred to a mounted state to indicate that the logical volumes are mounted by the processing apparatus that issued the copy request (step 406).

After setting the mounting flags, the disk array apparatus 131 performs a copy processing to transfer data from the copy source logical volume to the copy destination logical volume (step 407). When the copy processing terminates in step 408, the processing apparatus releases the copy source logical volume from its mounted state, and the mounting flag is rewritten to an unmounted state for the copy source logical volume.

On the other hand, for example, if the copy source logical volume is determined in step 404 to be already in a mounted state, the disk array apparatus 131 suspends the copy processing and stands by until the copy source logical volume transfers to an unmounted state (step 405). In such a situation, an error can be reported to the processing apparatus such that the processing apparatus can release, based on the error report, the copy source logical volume from the standby status. In this case, the operator may check the mounting status, and can release the mounting status of the copy source logical volume if necessary, and a copy request can be reissued subsequently.

For example, in the above situation, the processing apparatus that received the error report may display the mounting flag status to the operator, such that the operator can easily become aware of the current operation mode, which makes the operation processing efficient.

Figure 5:
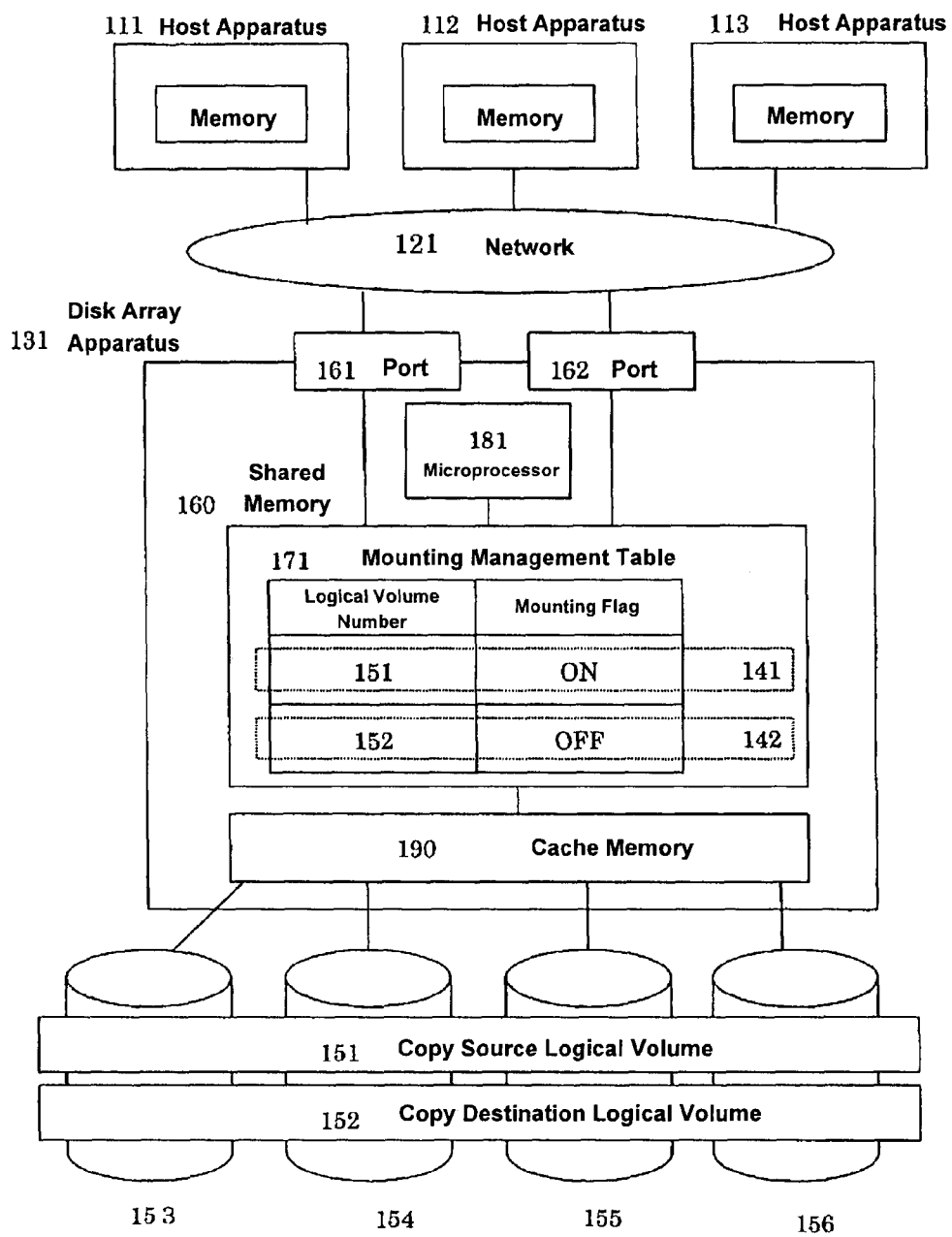
FIG. 5 shows a diagram of a storage control system in accordance with one embodiment example of the present invention.

The disk array apparatus 131 and the mounting flags 141 and 142 according to the present invention are described in greater detail with reference to FIG. 5. Processing apparatuses 111, 112 and 113 are similar to those described in FIG. 1. In FIG. 5, the processing apparatuses 111, 112 and 113 may be called host apparatuses from the perspective that they issue commands to the disk array apparatus 131.

The host apparatuses 111, 112 and 113 are connected to the disk array apparatus 131 via the network 121. The network 121 may be a network using a public telephone line, such as the Internet, or a local area network. Alternatively, the disk array apparatus 131 can be selectively connected to the host apparatus 111, 112 or 113 via switches.

The disk array apparatus 131 has a plurality of ports for connecting to the host apparatuses 111, 112 and 113 via the network 121. FIG. 5 shows an example in which the disk array apparatus 131 has two ports, a port 161 and a port 162.

The disk array apparatus 131 has a microprocessor 181, which controls storage of data received from the host apparatuses 111, 112 and 113 to hard disks 153, 154, 155 and 156, which are storage media. The microprocessor 181 can be configured as a plurality of microprocessors, each responsible for a particular processing. In the example in FIG. 5, only one microprocessor 181 is shown to simplify the description.

The microprocessor 181 refers to a shared memory 160 in order to proceed with its processing. The shared memory 160 stores configuration information of the disk array apparatus 131. Configuration information is used to manage how the disk array apparatus 131 is configured; for example, the configuration information indicates the capacity of a group of the HDDs connected and how logical volumes arranged among the group of the HDDs are configured.

The configuration information also includes such information as which logical volume allows access to which of the host apparatuses 111, 112 and 113. A cache memory 190 is a storage region that temporarily stores data received from the host apparatuses 111, 112 and 113.

A mounting management table 171 in accordance with an embodiment of the present invention is stored in the shared memory 160 and has the mounting flag management regions 141 and 142 for each logical volume number corresponding to one logical volume configured within the disk array apparatus 131. The mounting flags are managed in ON or OFF state, where a mounting flag is turned ON for a logical volume mounted by one of the host apparatuses 111, 112 and 113, and a mounting flag is turned OFF for a logical volume not mounted by any of the host apparatuses 111, 112 or 113.

Reference numeral 151 conceptually represents a copy source logical volume, while reference numeral 152 conceptually represents a copy destination logical volume. Although this example shows only two logical volume, more than two logical volumes may be provided. A logical volume is a storage region that straddles over a plurality of physically separate storage media and that is logically managed by a storage control apparatus. As a result, a series of write data received from one of the host apparatus 111, 112 and 113 may be stored scattered among the HDDs 153–156.

FIG. 6 is an example of the mounting management table 171 that manages mounting flags. The mounting status is indicated for each logical volume number assigned uniquely to every logical volume. A logical volume number indicated as "ON" in FIG. 6 indicates that the corresponding logical volume is mounted by one of the host apparatuses 111, 112 and 113, while a logical number indicated as "OFF" indicates that the corresponding logical volume is not mounted by any of the host apparatuses 111, 112 or 113.

For example, when the host apparatus 111 attempts to access data inside the logical volume 151, a processing to have the logical volume 151 mounted by the host apparatus 113 takes place via the network 121 and the port 161 (or the port 162). During this process, the microprocessor 181 inside the disk array apparatus 131 refers to the mounting management table 171 for the mounting flag information corresponding to the logical volume 151.

If the mounting flag corresponding to the logical volume 151 to be accessed is OFF, the microprocessor 181 turns the mounting flag ON. Next, the processing to mount the logical volume 151 takes place, which makes accesses to data inside the logical volume 151 possible.

When the logical volume 151 is accessed, a part of data inside the logical volume 151 is read to a memory of the host apparatus 113.

When the logical volume 151 is to be copied to the logical volume 152 based on an instruction from the host apparatus 111 subsequent to the mounting operation, the mounting management table 171 is referred to for the logical volumes 151 and 152 inside the disk array 131 via the network 121 and the port 162 (or the port 161).

In this case, the mounting flag for the logical volume 151 is ON, because, as described earlier, the logical volume 151 is mounted at least by the host apparatus 113. When an attempt is made to copy data in the logical volume 151 to the logical volume 152 in response to a copy request from the host apparatus 111 to copy data from the logical volume 151 to the logical volume 152, there is a possibility that data in the logical volume 151 could be updated by the host apparatus 113 during the copy processing; for this reason, when it is determined that the logical volume to be accessed is a logical volume whose mounting flag is ON, any other processing from any other host apparatus is considered an error and suspended, according to the present invention.

Further, even when the mounting flag for the logical volume 151 is OFF, if the mounting flag for the logical volume 152 is ON, which indicates that the logical volume 152 is already mounted by one of the host apparatuses 111, 112 and 113, there is a possibility that the logical volume 152 as a copy destination could be rewritten during the copy processing by the host apparatus that is mounting the logical volume 152.

To avoid such a situation, the copy processing is suspended and an error message is sent as a reply to the host apparatus that issued the copy request. The operator recognizes via the host apparatus that an error has occurred and, upon performing procedures required to release the mounting by the other host apparatus, can re-issue the copy command.

Although the present invention has been described using as an example logical volumes managed and controlled by one storage control apparatus, the present invention is also applicable to logical volumes managed and controlled by physically separate storage control apparatuses. In the latter case, a shared memory region that can be referred to by a processor of each of the storage control apparatuses may be provided to make data for managing mounting status available to every storage control apparatus.

The present invention makes unnecessary an operation that uses every information processing apparatus to check that a volume is not mounted before copying a volume, which can reduce operational load for operators involved in volume copy operations. Further, the present invention reduces the possibility of data corruption caused by an operational error to copy a volume (i.e., copying a volume unaware that the volume is already mounted by another host apparatus).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A storage control apparatus comprising:
a first port connected to a first information processing apparatus;
a second port connected to a second information processing apparatus;
a plurality of logical volumes that store write data received from a plurality of information processing apparatuses via the first port and the second port;
a processor that controls writing and reading of data to and from the logical volumes; and
a memory that is referred to by the processor,
wherein the memory stores mounting information that indicates as to whether each of the plurality of logical volumes is in a mounted state with any one of the information processing apparatuses,
wherein prior to one of said first and second information processing apparatuses conducting writing or reading of data to or from a logical volume via said processor, a mounting operation is conducted to mount said logical volume with respect to said one of said first and second information processing apparatuses, thereby setting said mounting information to indicate that such logical volume is in said mounted state,
wherein when a logical volume is in the mounted state, the logical volume is made to be accessible by said one of said first and second information processing apparatuses and not the other of said first and second information processing apparatuses, and
wherein when a logical volume is in an un-mounted state, said logical volume can be made to be accessible by any one of said first and second information processing apparatuses.

2. A storage control apparatus according to claim 1, wherein, upon receiving a copy instruction from the first information processing apparatus to copy a data image in a first one of the plurality of logical volumes to a second one of the plurality of logical volumes, the processor refers to the mounting information to check a mounted state of at least one of the first one and the second one of the logical volumes.

3. A storage control apparatus according to claim 2, wherein, when at least one of the first one of the logical volumes and the second one of the logical volumes is in a mounted state, the processor sends error information to the first information processing apparatus.

4. A storage control apparatus comprising:
a first port connected to a first information processing apparatus;
a second port connected to a second information processing apparatus;
a plurality of logical volumes that store write data received from a plurality of information processing apparatuses via the first port and the second port;
a processor that controls writing and reading of data to and from the logical volumes; and
a memory that is referred to by the processor,
wherein the memory stores mounting information that indicates as to whether each of the plurality of logical volumes is in a mounted state with any one of the information processing apparatuses,
wherein, upon receiving a copy instruction from the first information processing apparatus to copy a data image in a first one of the plurality of logical volumes to a second one of the plurality of logical volumes, the processor refers to the mounting information to check a mounted state of at least one of the first one and the second one of the logical volumes,
wherein, when at least one of the first one of the logical volumes and the second one of the logical volumes is in a mounted state, the processor waits to execute the copy instruction until the mounted state is released.

5. A storage control apparatus comprising:
a plurality of logical volumes that store data according to write requests received from a plurality of information processing apparatuses;
a plurality of ports that are connected to the information processing apparatuses;
a that controls writing and reading of data to and from the logical volumes; and
a memory that is referred to by the microprocessor,
wherein the memory stores mounting information that indicates as to whether each of the plurality of logical volumes is in a mounted state with any one of the information processing apparatuses,
wherein prior to one of said first and second information processing apparatuses conducting writing or reading of data to or from a logical volume via said processor, a mounting operation is conducted to mount said logical volume with respect to said one of said first and second information processing apparatuses, thereby setting said mounting information to indicate that such logical volume is in said mounted state,
wherein when a logical volume is in the mounted state, the logical volume is made to be accessible by said one of said first and second information processing apparatuses and not the other of said first and second information processing apparatuses, and
wherein when a logical volume is in an un-mounted state, said logical volume can be made to be accessible by any one of said first and second information processing apparatuses.

6. A storage control apparatus according to claim 5, wherein, upon receiving a copy instruction from one of the information processing apparatuses to copy a data image in a first one of the plurality of logical volumes to a second one of the plurality of logical volumes, the processor refers to the mounting information to check a mounted state of at least one of the first one and the second one of the logical volumes.

7. A storage control apparatus according to claim 6, wherein, when at least one of the first one of the logical volumes and the second one of the logical volumes is in a mounted state, the processor sends error information to the one of the plurality of information processing apparatuses.

8. A storage control apparatus comprising:
a plurality of logical volumes that store data according to write requests received from a plurality of information processing apparatuses;
a plurality of ports that are connected to the information processing apparatuses;
a processor that controls writing and reading of data to and from the logical volumes; and
a memory that is referred to by the microprocessor,
wherein the memory stores mounting information that indicates as to whether each of the plurality of logical volumes is in a mounted state with any one of the information processing apparatuses, wherein, upon receiving a copy instruction from one of the information processing apparatuses to copy a data image in a first one of the plurality of logical volumes to a second one of the plurality of logical volumes, the processor refers to the mounting information to check a mounted state of at least one of the first one and the second one of the logical volumes, wherein, when at least one of the first one of the logical volumes and the second one of the logical volumes is in a mounted state, the processor waits to execute the copy instruction until the mounted state is released.

9. A storage control system comprising:

a plurality of information processing apparatuses; and a storage control apparatus communicatively connected to the plurality of information processing apparatuses via a network, wherein the storage control apparatus comprises:

a plurality of logical volumes that store write data received from the plurality of information processing apparatuses;

a processor that controls writing and reading of data to and from the logical volumes; and a memory that stores mounting information indicating whether each of the plurality of logical volumes is in a mounted state with any one of the information processing apparatuses, wherein prior to one of said first and second information processing apparatuses conducting writing or reading of data to or from a logical volume via said processor, a mounting operation is conducted to mount said logical volume with respect to said one of said first and second information processing apparatuses, thereby setting said mounting information to indicate that such logical volume is in said mounted state, wherein when a logical volume is in the mounted state, a logical volume is made to be accessible by said one of said first and second information processing apparatuses and not the other of said first and second information processing apparatuses, and wherein when a logical volume is in an un-mounted state, said logical volume can be made to be accessible by any one of said first and second information processing apparatuses.

10. A storage control system according to claim 9, wherein, upon receiving a copy instruction from one of the information processing apparatuses to copy a data image in a first one of the plurality of logical volumes to a second one of the plurality of logical volumes, the processor refers to the mounting information to check a mounted state of at least one of the first one and the second one of the logical volumes.

11. A storage control system according to claim 10, wherein, when at least one of the first one and the second one of the logical volumes is in a mounted state, the processor sends error information to the one of the information processing apparatuses.

12. A storage control system comprising:

a plurality of information processing apparatuses; and a storage control apparatus communicatively connected to the plurality of information processing apparatuses via a network, wherein the storage control apparatus comprises:

a plurality of logical volumes that store write data received from the plurality of information processing apparatuses;

a processor that controls writing and reading of data to and from the logical volumes; and a memory that stores mounting information indicating whether each of the plurality of logical volumes is in a mounted state with any one of the information processing apparatuses, wherein, upon receiving a copy instruction from one of the information processing apparatuses to copy a data image in a first one of the plurality of logical volumes to a second one of the plurality of logical volumes, the processor refers to the mounting information to check a mounted state of at least one of the first one and the second one of the logical volumes, wherein, when at least one of the first one of the logical volumes and the second one of the logical volumes is in a mounted state, the processor waits to execute the copy instruction until the mounted state is released.

13. A control method for a storage control apparatus, the storage control apparatus including a first port connected to a first information processing apparatus, a second port connected to a second information processing apparatus, a plurality of logical volumes that store write data received from a plurality of information processing apparatuses via the first port and the second port, a processor that controls writing and reading of data to and from the logical volumes, and a memory that is referred to by the processor, the control method comprising:

a first step of updating a mounting status of each of the logical volumes registered in mounting information stored in the memory in response to a mounting/unmounting request for the logical volumes from one of first information processing apparatus and the second information processing apparatus; and a second step of referring to the mounting information in the memory when the storage control apparatus executes copying a data image of one of the plurality of logical volumes to another one of the logical volumes.

14. A control method for a storage control apparatus according to claim 13, further comprising:

a third step of stopping the copying if at least one of the one and the another of the logical volumes is found in the second step to be in a mounted state.

15. A control method for a storage control apparatus, the storage control apparatus including a first port connected to a first information processing apparatus, a second port connected to a second information processing apparatus, a plurality of logical volumes that store write data received from a plurality of information processing apparatuses via the first port and the second port, a processor that controls writing and reading of data to and from the logical volumes, and a memory that is referred to by the processor, the control method comprising the steps of:

storing in the memory mounting information that indicates as to whether each of the plurality of logical volumes is in a mounted state with any one of the information processing apparatuses; and referring to the memory in response to a copy instruction from the first information processing apparatus to copy a data image in a first one of the plurality of logical volumes to a second one of the plurality of logical volumes.

16. A control method for a storage control apparatus according to claim 15, further comprising the step of:

sending error information to the first information processing apparatus, when at least one of the first one and the second one of the logical volumes is in a mounted state.

17. A control method for a storage control apparatus according to claim 15, further comprising the step of:
when at least one of the first one and the second one of the logical volumes is in a mounted state, waiting to execute the copy instruction until the mounted state is released.

18. A control method for a storage control system comprising the steps of:
communicatively connecting a plurality of information processing apparatuses to a storage control apparatus via a network,
wherein the storage control apparatus includes a plurality of logical volumes that store write data received from the plurality of information processing apparatuses, a processor that controls writing and reading of data to and from the logical volumes, and a memory that is referred to by the processor; and
storing in the memory mounting information indicating whether each of the plurality of logical volumes is in a mounted state with any one of the information processing apparatuses,
wherein prior to one of a first and second information processing apparatuses conducting writing or reading of data to or from a logical volume via said processor, a mounting operation is conducted to mount said logical volume with respect to said one of said first and second information processing apparatuses, thereby setting said mounting information to indicate that such logical volume is in said mounted state,
wherein when a logical volume is in the mounted state, a logical volume is made to be accessible by said one of said first and second information processing apparatuses and not the other of said first and second information processing apparatuses, and
wherein when a logical volume is in an un-mounted state, said logical volume can be made to be accessible by any one of said first and second information processing apparatuses.

19. A control method for a storage control system according to claim 18, further comprising the step of:
referring to the memory in response to a copy instruction from one of the information processing apparatuses to copy a data image in a first one of the plurality of logical volumes to a second one of the plurality of logical volumes.

20. A control method for a storage control system according to claim 19, further comprising the step of:
sending error information to the one of the information processing apparatuses, when at least one of the first one and the second one of the logical volumes is in a mounted state.

21. A control method for a storage control system comprising the steps of:
communicatively connecting a plurality of information processing apparatuses to a storage control apparatus via a network,
wherein the storage control apparatus includes a plurality of logical volumes that store write data received from the plurality of information processing apparatuses; a microprocessor that controls writing and reading of data to and from the logical volumes; a memory that is referred to by the microprocessor;
storing in the memory mounting information indicating whether each of the plurality of logical volumes is in a mounted state with any one of the information processing apparatuses;
referring to the memory in response to a copy instruction from one of the information processing apparatuses to copy a data image in a first one of the plurality of logical volumes to a second one of the plurality of logical volumes; and
when at least one of the first one and the second one of the logical volumes is in a mounted state, waiting to execute the copy instruction until the mounted state is released.

22. The method of claim 21 further comprising the step of: referring to the memory before another of the information processing apparatuses begins a mounting process.

23. The method for a storage control system according to claim 22 further comprising the step of: sending error information to the one of the information processing apparatuses, when at least one of the first one and the second one of the logical volumes is in a mounted state.

24. The method for a storage control system according to claim 22 further comprising the step of: when at least one of the first one and the second one of the logical volumes is in a mounted state, waiting to execute a copy instruction until the mounted state is released.

* * * * *